2,787,525
REMOVAL OF FREE CHLORINE FROM HCl

Bernard J. De Witt, Akron, Ohio, assignor, by mesne assignments, to Columbia-Southern Chemical Corporation, Pittsburgh, Pa., a corporation of Delaware No Drawing. Application January 23, 1952,
Serial No. 267,923

11 Claims. (Cl. 23—154)

This invention relates to a method of removing free chlorine from HCl.

Commercially available HCl frequently contains free chlorine which renders the HCl undesirable for certain industrial purposes. One commercial source of hydrogen chloride is derived from the chlorination of hydrocarbons such as benzene, methane, propane and the like. Hydrogen chloride produced by this method invariably contains an undesirable content of free chlorine. The amount of free chlorine present exceeds 40 parts per million and usually amounts to from 100 up to 2000 parts per million of the hydrogen chloride.

Attempts to remove this free chlorine, heretofore, have not been successful except at the expense of purity and/or strength of the acid. Thus while certain agents will instantaneously reduce the free chlorine in hydrochloric acid, the use of such agents is not completely satisfactory due to the introduction of undesirable impurities in the final acid.

According to this invention, I have discovered that free chlorine can be removed from HCl without sacrificing the purity of the final product by the use of hydrazine or hydrazine derivatives. In practice, hydrazines are added to aqueous solutions of hydrogen chloride to remove the free chlorine. The invention may be satisfactorily followed by treating hydrochloric acids of all strengths, although normally commercial strengths of acids containing in excess of 30 percent by weight of hydrogen chloride are treated.

I have found that hydrazines in general, are satisfactory for the purposes of practicing this invention. Hydrazine, hydrazine hydrate (hydrazine with water of crystallization) and hydrazine hydrochloride (the mono or di hydrochloride), are particularly useful because, upon oxidation or chlorination, they only produce compounds which are present in commercial HCl. Other hydrazines such as hydrazine formate, hydrazine oxalate, hydrazine sulfate, hydrazine azo amide, hydrazine phosphate, hydrazine nitrate, phenyl hydrazine and the like, effectively remove free chloride from HCl although their use may result in the production of compounds not normally present in such HCl. Thus hydrazine sulfate is suitable for removing free chlorine from HCl, but its use results in the production of small amounts of sulfuric acid. In instances where the presence of a trace of sulfuric acid in the HCl is immaterial, hydrazine sulfate is as effective as hydrazine hydrate or hydrazine hydrochloride in removing free chlorine in the practice of my invention.

My invention has been successfully performed by simply adding a hydrazine compound to HCl. Hydrazine compounds, either in their crystalline form or in aqueous solutions, have been employed while the HCl may be gaseous or liquid hydrogen chloride, which may contain little or no water or in solution as hydrochloric acid.

The concentration of hydrazine, when it is added as a solution, is not critical and solutions of any convenient strength may be employed. Preferably, solutions of reasonable strength should be used to avoid the presence of an undue amount of solvent in the final HCl. In the removal of free chlorine from hydrochloric acid, the use of very dilute solutions may conceivably effect the strength of the acid. I have found hydrazine solutions of 10 percent by weight of the hydrazine and above, provide suitable results without materially reducing the strength of hydrochloric acid.

As a general rule, when hydrazine solutions are employed, water is the solvent. Aqueous solutions are preferable because water does not contaminate HCl. This is true because water vapor is usually present in hydrogen chloride (gaseous state) and hydrochloric acid is itself an aqueous solution. Other liquids which are chemically inert with respect to hydrazines and HCl also may be used as hydrazine solvents. Controlling factors in selecting a hydrazine solvent are (1) chemical inertness to hydrazines and HCl and (2) contaminating effect on the final chlorine free acid. The latter requisite for the solvent depends on the ultimate use of the HCl. Thus a given solvent which may prove undesirable when the HCl is destined for one use may be satisfactory when the HCl is to be employed for different purposes.

Determination of the amount of hydrazine to be added, is dependent on the amount of free chlorine to be removed. Experimentation has shown that approximately two moles of chlorine are removed per mole of hydrazine added. (See Table II.)

The reaction probably occurs in accordance with the following equation when hydrazine is used:

$$N_2H_4 + 2Cl_2 \rightarrow N_2 + 4HCl$$

Other hydrazines react similarly with the chlorine to effect free chlorine removal.

Usually sufficient amounts of a hydrazine are added to reduce the free chlorine to below 40 parts per million of the acid. However, all the free chlorine may be removed by merely adding an amount of a hydrazine determined upon the premise that each hydrazine radical will remove approximately two moles of chlorine.

Hydrazines are normally added to the hydrochloric acid at room temperatures. Satisfactory results, though, may be achieved at any convenient temperature.

The reaction of the hydrazine with chlorine is essentially simultaneous and free chlorine is removed instantaneously from the acid. For practical purposes, however, it is advisable to agitate the mixture of acid and hydrazine to effect better distribution of the hydrazine. Agitation for two hours in commercial operation achieves the desired result. Shorter periods will also be satisfactory; the only practical restriction on effective agitation periods being the desirability of enhancing and speeding the dissolving and distribution of all the added hydrazine.

The following examples illustrate my process:

EXAMPLE I

Three drops (0.18 milliliter) of essentially pure hydrazine hydrate were added to a two gallon bottle filled with seven liters of an aqueous solution of hydrochloric acid containing 35 percent by weight of HCl and 70 parts per million of free chlorine at room temperature. Considerable spattering occurred and the bottle was tilted and rotated to wash down the spattered hydrazine. After 1.5 hours of agitation the acid contained 16 parts per million of free chlorine. No change in purity or strength of the acid was produced.

EXAMPLE II

To 1800 milliliters of an aqueous solution of hydrochloric acid containing 35 percent by weight of HCl and 432 parts per million of free chlorine, 2.76 milliliters of an aqueous hydrazine hydrate solution containing 10 percent by weight of the hydrazine, were added at room temperature. After the precipitated hydrazine hydrochloride was dissolved and agitated for 0.5 hour, a sample of the acid was removed and analyzed for free chlorine. Several more additions of the hydrazine hydrate solution and sample removals were made and analyzed until the acid contained excess hydrazine. The results of these analyses are set forth in Table I.

Table I

| Sample | Milliliters of $N_2H_4 \cdot H_2O$ Solution added | Time of Agitation, Minutes | Free $Cl_2$ in Acid, parts per million of acid |
|---|---|---|---|
| 0 | 0 | 0 | 432 |
| 1 | 2.76 | 40 | 67 |
| 2 | 0.24 | 60 | 30 |
| 3 | 0.10 | 50 | 15 |
| 4 | 0.035 | 60 | 9 |
| 5 | 0.035 | 60 | 0 |
| 6 | 0.030 | 60 | excess $N_2H_4$ |

EXAMPLE III

A few crystals of hydrazine sulfate were added to 100 milliliters of an aqueous solution of hydrochloric acid having 35 percent by weight of HCl and 79 parts per million of free chlorine at room temperature. After about 0.5 hour, an iodimetric titration indicated the free chlorine was reduced to 37 parts per million of the acid.

EXAMPLE IV

Three 500 gram samples of an aqueous solution of hydrochloric acid containing 35 percent by weight of HCl and different amounts of free chlorine, were treated with various amounts of hydrazine sulfate at room temperature. The samples were agitated until all the hydrazine sulfate was dissolved. The free chlorine present was determined by iodimetric titration. Table II shows the results:

Table II

| Weight of Acid, Grams | Free $Cl_2$ in Acid, p. p. m.[1] | $N_2H_4 \cdot H_2SO_4$ added, Grams | Time of Treatment, Hours | Free $Cl_2$ in Acid after Treatment, p. p. m.[1] | Moles $Cl_2$ removed per mole $N_2H_4$ |
|---|---|---|---|---|---|
| 500 | 82 | 0.0353 | 1.75 | 2 | 2.07 |
| 500 | 440 | 0.0355 | 3 | 354 | 2.21 |
| 500 | 467 | 0.2002 | 4 | 42 | 1.94 |

[1] Parts per million of acid.

Other modifications and variations will be apparent to one skilled in the art, and are possible without departing from this spirit and scope of the invention as defined in the following claims.

What I claim is:

1. The method of treating HCl containing free chlorine in amounts of from 40 parts per million up to 2000 parts per million thereof by weight of the HCl which comprises adding a hydrazine to said hydrogen chloride whereby the free chlorine content of the HCl is reduced.

2. The method of claim 1 wherein sufficient hydrazine is added to reduce the free chlorine content below 40 parts per million by weight of the HCl.

3. The method of claim 2 wherein the hydrazine is hydrazine.

4. The method of claim 2 wherein the hydrazine is hydrazine hydrochloride.

5. The method of claim 2 wherein the hydrazine is hydrazine sulphate.

6. The method of treating HCl containing free chlorine in amounts of from 40 parts per million up to 2000 parts per million thereof by weight of the HCl which comprises adding a hydrazine to said HCl, said hydrazine being selected from the group consisting of hydrazine, hydrazine hydrate, and hydrazine hydrochloride.

7. The method of claim 6 wherein the hydrazine compound is added in sufficient quantities to reduce the free chlorine content of the HCl to at least below 40 parts per million by weight of the HCl.

8. In the process of supplying hydrochloric acid to commerce, the improvement which comprises adding a small amount of a hydrazine to aqueous hydrochloric acid containing a minor quantity of free chlorine whereby to reduce the free chlorine content thereof and supplying the resulting hydrochloric acid for industrial use.

9. In the process of supplying hydrochloric acid to commerce, the improvement which comprises adding a small amount of a hydrazine to aqueous hydrochloric acid having a hydrogen chloride content of at least 30 percent by weight and containing a minor quantity of free chlorine whereby to reduce the free chlorine content thereof and supplying the resulting hydrochloric acid for industrial use.

10. In the process of supplying hydrochloric acid to commerce, the improvement which comprises adding a small amount of a compound selected from the group consisting of hydrazine, hydrazine hydrate and hydrazine hydrochloride to aqueous hydrochloric acid containing a minor quantity of free chlorine whereby to reduce the free chlorine content of the acid and supplying the resulting acid for industrial use.

11. In the process of supplying hydrochloric acid derived from chlorination of organic compounds to commerce, the improvement which comprises adding a small amount of a hydrazine to aqueous hydrochloric acid containing a minor quantity of free chlorine as an incident to the organic chlorination whereby to reduce the free chlorine content of the acid with said hydrazine and supplying the resulting hydrochloric acid for industrial use.

References Cited in the file of this patent
UNITED STATES PATENTS

| 787,221 | Ramage | Apr. 11, 1905 |
| 1,234,457 | Glaeser | July 24, 1917 |

OTHER REFERENCES

"Solubilities of Inorganic and Organic Compounds" by A. Seidell, vol. 2, 1928 ed., page 1230, D. van Nostrand Co., Inc., N. Y.

"The Chemistry of Hydrazine" by L. F. Audrieth and B. A. Ogg, pages 173, 174, John Wiley and Sons, Inc., N. Y.

"A Dictionary of Chemical Solubilities—Inorganic," by Comey and Hahn, second ed., 1921, pages 373, 375, The MacMillan Co., N. Y.

J. W. Mellor's "A Comprehensive Treatise on Inorganic and Theoretical Chemistry," vol. 8, page 325, Longmans, Green and Company, N. Y.

"Baker's Analyzed C. P. Chemicals and Acids Catalog," Jan. 1, 1935, page 5.

"Baker's Analyzed Reagents Catalog," July 1951, page 103.

J. W. Mellor's "A Comprehensive Treatise on Inorganic and Theoretical Chemistry," vol. 2, page 91, vol. 8, page 313, Longmans, Green and Co., N. Y.